United States Patent
Cui et al.

(10) Patent No.: US 10,776,465 B2
(45) Date of Patent: Sep. 15, 2020

(54) CONTROL METHOD AND ELECTRONIC DEVICE

(71) Applicant: Lenovo (Beijing) Limited, Beijing (CN)

(72) Inventors: Jinxuan Cui, Beijing (CN); Weixian Guo, Beijing (CN); Xuguo Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 171 days.

(21) Appl. No.: 15/372,225

(22) Filed: Dec. 7, 2016

(65) Prior Publication Data

US 2017/0161481 A1    Jun. 8, 2017

(30) Foreign Application Priority Data

Dec. 7, 2015 (CN) .......................... 2015 1 0888654

(51) Int. Cl.
*G06F 21/32* (2013.01)
*G06F 9/445* (2018.01)
*G06F 21/62* (2013.01)
*G06F 9/451* (2018.01)

(52) U.S. Cl.
CPC .......... *G06F 21/32* (2013.01); *G06F 9/44505* (2013.01); *G06F 9/44526* (2013.01); *G06F 21/629* (2013.01); *G06F 9/451* (2018.02)

(58) Field of Classification Search
CPC .. G06F 21/32; G06F 9/44526; G06F 9/44505; G06F 21/629; G06F 9/451; G06F 21/62; G06F 9/445; G06F 9/00; G06F 9/0004; G06F 9/00087

USPC .......... 726/19, 18, 5, 2, 4, 17; 713/186, 170, 713/167, 168
See application file for complete search history.

(56) References Cited

U.S. PATENT DOCUMENTS

| 2012/0185936 A1* | 7/2012 | Lakshminarayanan ...................... G06F 21/52 726/22 |
| 2013/0179957 A1* | 7/2013 | Takata ..................... G06F 21/32 726/7 |
| 2016/0011767 A1* | 1/2016 | Jung .................... G06K 9/0004 715/847 |
| 2017/0053109 A1* | 2/2017 | Han ........................ G06F 21/32 |

FOREIGN PATENT DOCUMENTS

| CN | 101667234 A | 3/2010 |
| CN | 104361272 A | 2/2015 |
| CN | 104573454 A | 4/2015 |

(Continued)

*Primary Examiner* — Kevin Bechtel
*Assistant Examiner* — Quazi Farooqui
(74) *Attorney, Agent, or Firm* — Kunzler Bean & Adamson

(57) ABSTRACT

For performing a function of an electronic device in response to a target fingerprint, methods and apparatus are disclosed. The method includes acquiring a target fingerprint on the electronic device. The method also includes determining whether a target application identifier and a target operation identifier correspond to the target fingerprint. The method further includes utilizing a target application indicated by the target application identifier to execute, automatically, a target function indicated by the target operation identifier in response to a target application identifier and a target operation identifier corresponding to the target fingerprint.

18 Claims, 6 Drawing Sheets

(56) References Cited

FOREIGN PATENT DOCUMENTS

| | | |
|---|---|---|
| CN | 104717357 A | 6/2015 |
| CN | 105069404 A | 11/2015 |
| JP | 2009048418 A | 3/2009 |
| WO | WO-2015072677 A1 * | 5/2015 ........... G06F 3/0488 |

* cited by examiner

CONTROL METHOD AND ELECTRONIC DEVICE

CROSS-REFERENCE TO RELATED APPLICATIONS

This patent application claims priority to People's Republic of China Patent Application No. 201510888654.7 filed on 7 Dec. 2015 for Jinxuan CUI, Weixian GUO, and Xuguo LIU, the entire contents of which are incorporated herein by reference for all purposes.

FIELD

The subject matter disclosed herein relates to the field of device control technologies, and in particular, to automatically perform a function of an electronic device in response to a target fingerprint.

BACKGROUND

With the development of electronic technologies, smart terminals such as cell phones are more and more widely used in people's lives, and there are more and more various functions on cell phones, such as making calls, sending text messages, video calls, playing games etc.

However, when users who are unaccustomed to operations, such as the elderly, turn on a function, they generally need to perform operations such as unlocking, application selection and function selection. The complexity of such operations is high, and can negatively affect user experience.

SUMMARY

An apparatus for performing a function of an electronic device in response to a target fingerprint is disclosed. A method and computer program product also perform the functions of the apparatus.

A method for performing a function of an electronic device in response to a target fingerprint includes acquiring a target fingerprint on the electronic device. The method also includes determining whether a target application identifier and a target operation identifier correspond to the target fingerprint. The method further includes utilizing a target application indicated by the target application identifier to execute, automatically, a target function indicated by the target operation identifier in response to a target application identifier and a target operation identifier corresponding to the target fingerprint.

In some embodiments, utilizing the target application indicated by the target application identifier to execute, automatically, a target function indicated by the target operation identifier includes both identifying a functional module in correspondence with the target fingerprint in the target application and utilizing the target application to execute, automatically, the functional module. In one embodiment, utilizing the target application indicated by the target application identifier to execute, automatically, a target function indicated by the target operation identifier may include identifying a communication operation type from the target operation identifier and executing a communication operation in the target application indicated by the communication operation type.

In certain embodiments, the electronic device is in a screen locked state before acquiring the target fingerprint on the electronic device. In one such embodiment, the method may include placing the electronic device in a screen unlocked state in response to the target fingerprint matching a screen unlocking fingerprint of the electronic device. In another such embodiment, the method may include determining whether the target fingerprint matches a screen unlocking fingerprint of the electronic device in response to determining that the target application identifier and the target operation identifier do not correspond to the target fingerprint. Such an embodiment may further include placing the electronic device in a screen unlocked state in response to the target fingerprint matching a screen unlocking fingerprint of the electronic device.

In some embodiments, utilizing the target application indicated by the target application identifier to execute, automatically, a target function indicated by the target operation identifier includes determining whether the target application is currently running on the electronic device. In such embodiments, the method further includes launching the target application indicated by the target application identifier in response to the target application not currently running on the electronic device. The electronic device may be in a screen locked state before acquiring the target fingerprint. In such an embodiment, launching a target application indicated by the target application identifier may include controlling the electronic device to enter an unlocked state from a screen locked state prior to launching the target application.

In certain embodiments, determining whether a target application identifier and a target operation identifier correspond to the target fingerprint comprises searching a predetermined information list. In one embodiment, the predetermined information list stores a plurality of target fingerprints, each target fingerprint corresponding to a different target function.

An electronic device for performing a function of an electronic device in response to a target fingerprint includes a fingerprint acquisition unit. The electronic device also includes a processor and a memory that stores code executable by the processor. When executed, the code causes the processor to acquire a target fingerprint on the electronic device, determine whether a target application identifier and a target operation identifier correspond to the target fingerprint, and utilize a target application indicated by the target application identifier to execute, automatically, a target function indicated by the target operation identifier in response to a target application identifier and a target operation identifier corresponding to the target fingerprint.

In some embodiments, utilizing the target application indicated by the target application identifier to execute, automatically, a target function indicated by the target operation identifier includes the processor both identifying a functional module in correspondence with the target fingerprint in the target application and utilizing the target application to execute, automatically, the functional module. In one embodiment, the utilizing the target application indicated by the target application identifier to execute, automatically, a target function indicated by the target operation identifier includes the processor both identifying a communication operation type from the target operation identifier and executing a communication operation in the target application indicated by the communication operation type.

In certain embodiments, the electronic device is in a screen locked state before the processor acquires the target fingerprint on the electronic device. In one such embodiment, the processor further places the electronic device in a screen unlocked state in response to the target fingerprint matching a screen unlocking fingerprint of the electronic device. In another such embodiment, the processor further determines whether the target fingerprint matches a screen unlocking fingerprint of the electronic device in response to determining that the target application identifier and the target operation identifier do not correspond to the target fingerprint. Such an embodiment may further include the processor placing the electronic device in a screen unlocked state in response to the target fingerprint matching a screen unlocking fingerprint of the electronic device.

In some embodiments, utilizing the target application indicated by the target application identifier to execute, automatically, a target function indicated by the target operation identifier includes the processor determining whether the target application is currently running on the electronic device. In such embodiments, the processor launches the target application indicated by the target application identifier in response to the target application not currently running on the electronic device. The electronic device may be in a screen locked state before acquiring the target fingerprint. In such an embodiment, launching a target application indicated by the target application identifier may include the processor controlling the electronic device to enter an unlocked state from a screen locked state prior to launching the target application.

In certain embodiments, wherein determining whether a target application identifier and a target operation identifier correspond to the target fingerprint comprises the processor searching a predetermined information list. In one embodiment, the predetermined information list stores a plurality of target fingerprints, each target fingerprint corresponding to a different target function.

A program product including a computer readable storage medium that stores code executable by a processor, the executable code including code to perform: acquiring a target fingerprint on the electronic device, determining whether a target application identifier and a target operation identifier correspond to the target fingerprint, and utilizing a target application indicated by the target application identifier to execute, automatically, a target function indicated by the target operation identifier in response to a target application identifier and a target operation identifier corresponding to the target fingerprint.

In some embodiments, utilizing the target application indicated by the target application identifier to execute, automatically, a target function indicated by the target operation identifier includes identifying a functional module in correspondence with the target fingerprint in the target application; and utilizing the target application to execute, automatically, the functional module. In certain embodiments, utilizing the target application indicated by the target application identifier to execute, automatically, a target function indicated by the target operation identifier includes: determining whether the target application is currently running on the electronic device; and launching the target application indicated by the target application identifier in response to the target application not currently running on the electronic device.

In certain embodiments, wherein determining whether a target application identifier and a target operation identifier correspond to the target fingerprint comprises searching a predetermined information list. In one embodiment, the predetermined information list stores a plurality of target fingerprints each target fingerprint corresponding to a different target function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
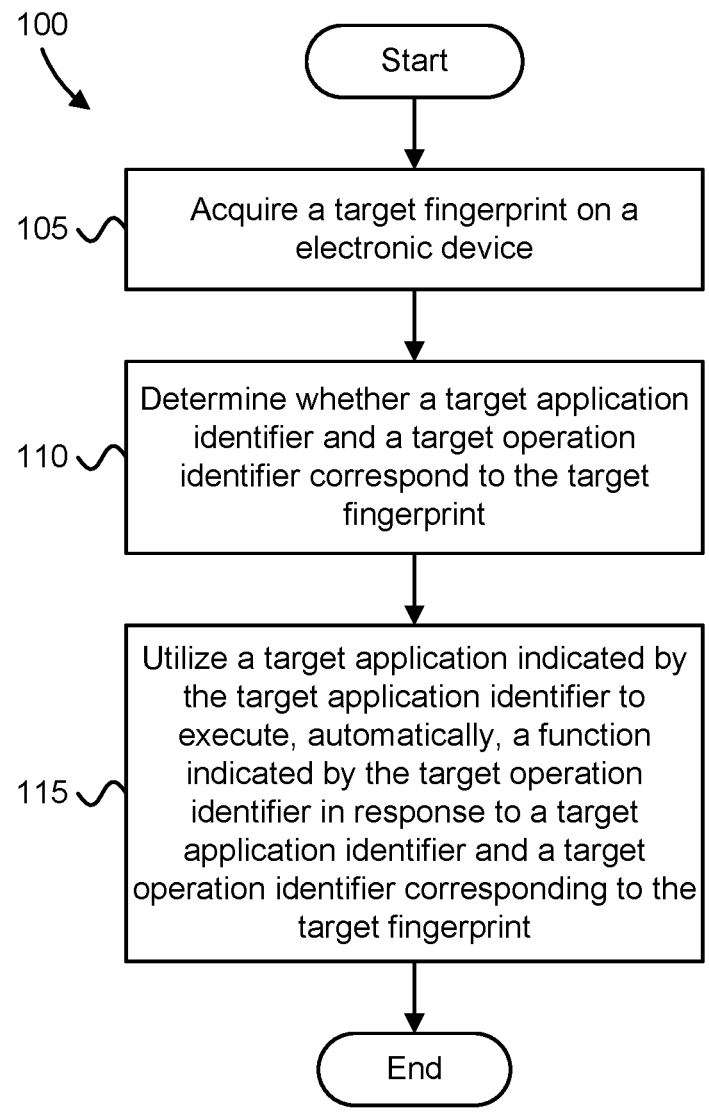
FIG. 1 is a flow diagram of a method for performing a function of an electronic device in response to a target fingerprint.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as "units," in order to more particularly emphasize their implementation independence. For example, a "unit" may be implemented as a hardware circuit comprising custom VLSI circuits or gate arrays, off-the-shelf semiconductors such as logic chips, transistors, or other discrete components. A "unit" may also be implemented in programmable hardware devices such as field programmable gate arrays, programmable array logic, programmable logic devices, or the like.

"Units" may also be implemented in code and/or software for execution by various types of processors. An identified unit of code may, for instance, comprise one or more physical or logical blocks of executable code which may, for instance, be organized as an object, procedure, or function. Nevertheless, the executables of an identified "unit" need not be physically located together, but may comprise disparate instructions stored in different locations which, when joined logically together, comprise the unit and achieve the stated purpose for the unit.

Indeed, a unit of code may be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different computer readable storage devices. Where a unit or portions of a unit are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a unit, segment, or portion of code, which comprises one or more executable instructions of the code for implementing the specified logical function(s).

It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a flow diagram illustrating a method 100 for performing a function of an electronic device in response to a target fingerprint, according to embodiments of the disclosure. In one embodiment, the method 100 may be implemented by an electronic device having a fingerprint acquisition function, such as a cell phone, a pad, or other suitable electronic device. Examples of suitable electronic devices are discussed in further detail below with reference to FIGS. 6-8. Alternatively, the method 100 may be performed by a processor and a computer readable storage medium. The computer readable storage medium may store code that is executed on the processor to perform the functions of the method 100.

The method 100 begins and acquires 105 a target fingerprint on the electronic device. The electronic device may be a device with a touchscreen display and a fingerprint sensor. In some embodiments, when an operation body of a user, such as a finger, performs a clicking operation on the touchscreen display, a target fingerprint of the user who performs the operation on the electronic device is acquired 105 in response to the clicking operation. The target fingerprint may be a fingerprint of the operation body of the user, such as a finger on the right hand, when the clicking operation is performed on the electronic device. In one embodiment, fingerprint sensor may be collocated with the touch display, such that the target fingerprint is acquired 105 when the operation body touches the touch display. In another embodiment, the target fingerprint is separately acquired 105 by the fingerprint sensor.

The method 100 also determines 110 whether a target application identifier and a target operation identifier correspond to the target fingerprint. For example, the electronic device may contain in a predetermined information list that lists target application identifiers and a target operation identifiers corresponding to different fingerprints. In some embodiments, the information list is a list preset on the electronic device. The information list may include multiple application identities and operation identities, each of the application identities and the operation identities having a corresponding target fingerprint therewith. In various embodiments, determining 110 whether a target application identifier and a target operation identifier correspond to the target fingerprint may include searching for a fingerprint in the information list that matches the acquired target fingerprint and identifying a corresponding target application identifier and target operation identifier if the target fingerprint is included in the information list.

In some embodiments, different fingerprints of a user may correspond to different target application identifiers and target operation identifiers. In certain embodiments, the list may store fingerprints and corresponding target application/operation identifiers for different users of the electronic device. Thus, in one embodiment, the processor searches for a target application identifier and a target operation identifier in the information list that correspond to the target fingerprint.

For example, the information list may include various target application identities, including a WeChat application identifier, a telephone communication application identifier, game dialogue application identifier, and text message application identifier, a social media network application identifier, a content sharing application identifier, and the like. In a further example, the target operation identifiers stored in the information list may include various communication counterparts (e.g., contacts, such as a contact "Zhangsan," a contact "Lisa," etc. Additionally (or alternatively), the target operation identifiers stored in the information list may include various communication types, such as text entry, voice input, etc.

The method 100 includes utilizing 115 a target application indicated by the target application identifier to execute, automatically, a target function indicated by the target operation identifier in response to a target application identifier and a target operation identifier corresponding to the target fingerprint. As used herein, automatically executing the target function indicated by the target operation identifier refers to executing the target function without further need for user input when a target application identifier and a target operation identifier correspond to the target fingerprint.

In some embodiments, utilizing 115 a target application indicated by the target application identifier to execute, automatically, a target function indicated by the target operation identifier includes launching a target application associated with the target application identifier when the target fingerprint is found in the information list. Accordingly, the target application corresponding to the target application identifier is enabled directly (e.g., automatically) in response to a target application identifier and a target operation identifier corresponding to the target fingerprint, with the target application being utilized to enable the target function indicated by the target operation identifier.

For example, WeChat may be launched to initiate a communication function (e.g., voice chat, voice call, video call, group chat, etc.) with the contact "Zhangsan" in response to acquiring the target fingerprint. Here, the target application associated with the target fingerprint is the WeChat application and the target operation is initiating a communication function with the user's contact "Zhangsan." In another example, a directory/window may be opened to present a telephone dial-up communication function in response to acquiring the target fingerprint. Here, the target application associated with the target fingerprint is a telephone application and the target operation is presenting the directory/window for a telephone dial-up communication function.

As another example, a text message application may be opened to initiate a text message with the user's contact "Zhangsan." Here, the target application associated with the target fingerprint is the text message application and the target operation is initiating a text message with the user's contact "Zhangsan." In these procedures, only a fingerprint input operation is required by the user to accomplish the corresponding function using the relation between the fingerprint and the identities in the information list in the embodiment. Beneficially, the user does not have to perform clicking, selecting and finger input operations multiple times, resulting in user operation steps being saved, operation complexity being reduced, and user experience being significantly improved.

Figure 2:
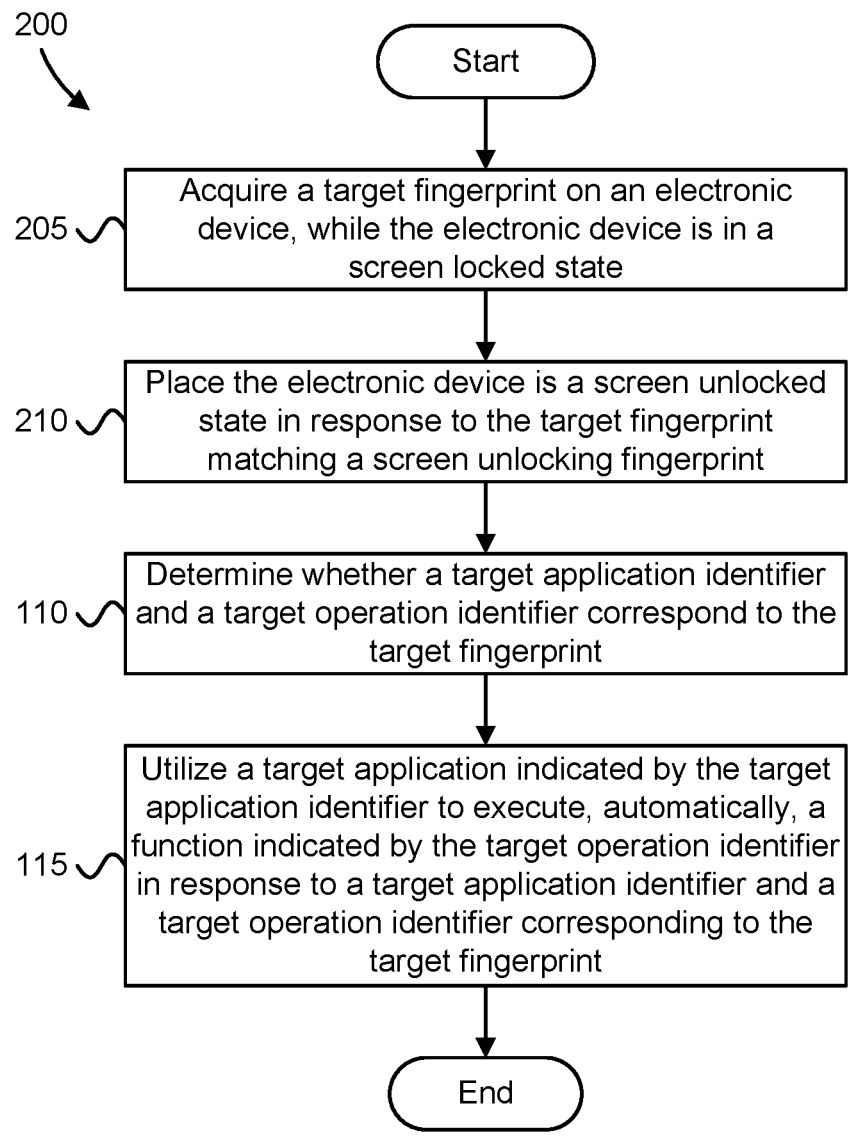
FIG. 2 is a flow diagram of another method for performing a function of an electronic device in response to a target fingerprint.

FIG. 2 is a flow diagram illustrating a method 200 for performing a function of an electronic device in response to a target fingerprint, according to embodiments of the disclosure. In one embodiment, the method 200 may be implemented by an electronic device having a fingerprint acquisition function, such as a cell phone, a pad, or other suitable electronic device. Examples of suitable electronic devices are discussed in further detail below with reference to FIGS. 6-8. Alternatively, the method 200 may be performed by a processor and a computer readable storage medium. The computer readable storage medium may store code that is executed on the processor to perform the functions of the method 200. The method 200 may be one embodiment of the method 100 discussed above with reference to FIG. 1.

In the embodiments, of FIG. 2, the electronic device is presumed to be in a screen locked state. Specifically, the method 200 begins and acquires 205 a target fingerprint on an electronic device, while the electronic device is in a locked state. Accordingly, the method 220 places 210 the electronic device in a screen unlocked state in response to the target fingerprint matching a screen unlocking fingerprint. Further, the method 200 includes steps of determining 110 whether a target application identifier and a target operation identifier correspond to the target fingerprint and utilizing 115 a target application indicated by the target application identifier to execute, automatically, a target function indicated by the target operation identifier in response to a target application identifier and a target operation identifier corresponding to the target fingerprint, as discussed above in the method 100.

In some embodiments, the method 200 may abort if the target fingerprint does not match any screen unlocking fingerprint. In other embodiments, the method 200 may query for a passcode, password, or other form of user authentication if the target fingerprint does not match any screen unlocking fingerprint. Additionally, the method 200 may wait to utilizing 115 the target application to automatically execute the target function indicated by the target operation identifier until the user is authenticated.

While depicted as placing 210 the electronic device in an unlocked state before determining 110 whether a target application identifier and a target operation identifier correspond to the target fingerprint, in other embodiment, the method 200 may place 210 the electronic device is a screen unlocked state at any time after acquiring 205 the target fingerprint while the electronic device is in a locked state. In one embodiment, the method 200 includes placing 210 the electronic device in an unlocked state after determining 110 whether a target application identifier and a target operation identifier correspond to the target fingerprint. In another embodiment, the method 200 includes placing 210 the electronic device in an unlocked state after beginning to execute the target function indicated by the target operation identifier. For example, the electronic device may launch the target application, may initiate a communication function, may open a dialog window, etc. before placing 210 the electronic device in an unlocked state.

In some embodiments, the target fingerprint may not correspond to a target application identifier and a target operation identifier. For example, the user may touch the fingerprint sensor with the left index finger and the information list may not contain an entry corresponding to the fingerprint of the left index finger. Where the target fingerprint matches a screen unlocking fingerprint, but does not correspond to a target application identifier and a target operation identifier, then the method 220 may place 210 the electronic device in a screen unlocked state without utilizing any target application to automatically execute a target function (due to the target fingerprint not corresponding to a target application identifier and a target operation identifier).

While the method 200 includes placing 210 the electronic device in a screen unlocked state in response to the target fingerprint matching a screen unlocking, in other embodiment an electronic device according to the disclosure may not perform the unlocking operation, but rather automatically execute the target function without unlocking the electronic device.

Figure 3:
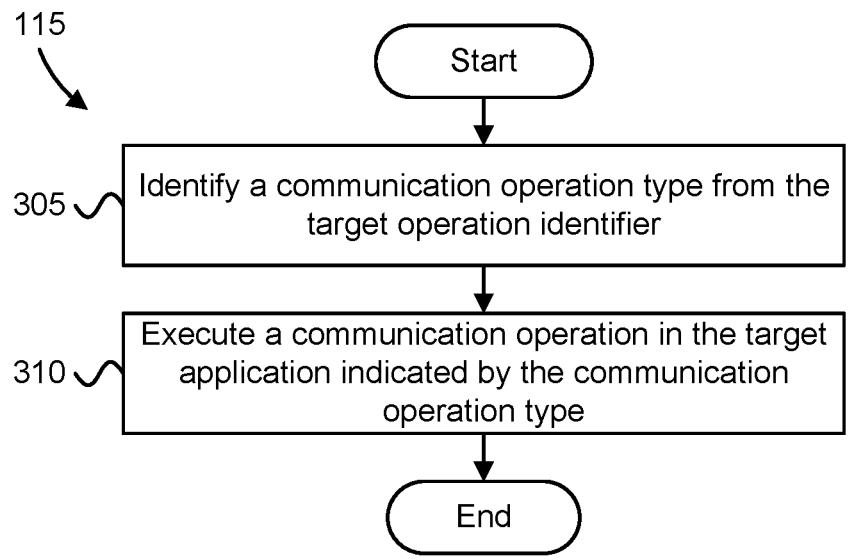
FIG. 3 is a flow diagram of a method for executing a function indicated by a target operation identifier.

FIG. 3 is a flowchart describing the step of utilizing 115 a target application indicated by the target application identifier to execute, automatically, a target function indicated by the target operation identifier in response to a target application identifier and a target operation identifier corresponding to the target fingerprint, discussed above with reference to FIGS. 1 and 2. As depicted, utilizing 115 a target application to automatically execute a target function may be implemented by identifying 305 a communication operation type in the target operation identifier. In certain embodiments, the communication operation type may be a type of voice communication, text communication, video communication, or the like.

Utilizing 115 a target application to automatically execute a target function may further include executing 310 a communication operation indicated by the communication operation type on the electronic device based on the target application. In some embodiments, the target operation identifier stored in the information list indicates a communication method (e.g., operation type) as well as other parameters for executing the target function, such as a communication counterpart, etc. Accordingly, an operation of a specific communication type, for example, voice communication, text communication or video communication type may be performed on the electronic device after the target application is launched. In one example, an operation of video communication type is performed using the WeChat application. In another example, an operation of text communication type is performed using a text messaging application. In a further example, an operation of voice communication type is performed based on a directory/window for a telephone application, and the like.

Figure 4:
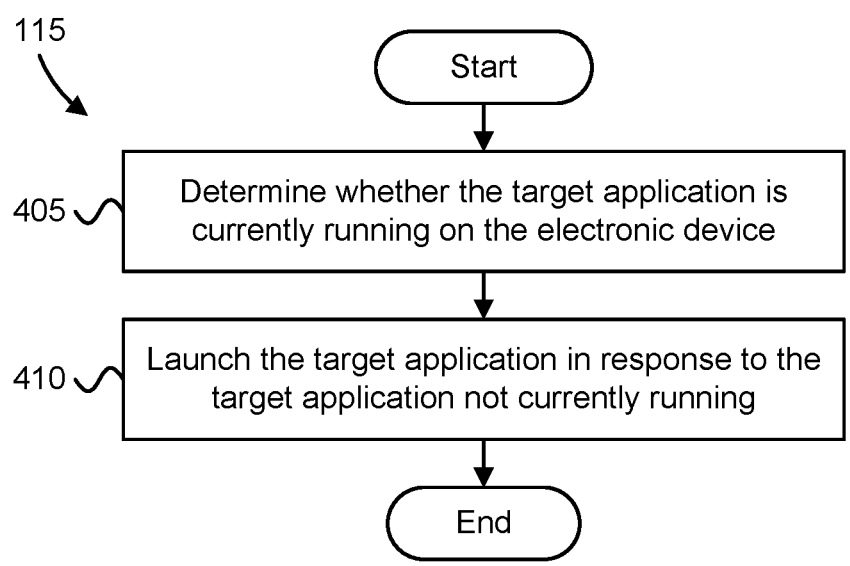
FIG. 4 is a flow diagram of another method for executing a function indicated by a target operation identifier.

FIG. 4 is a flowchart describing the step of utilizing 115 a target application indicated by the target application identifier to execute, automatically, a target function indicated by the target operation identifier in response to a target application identifier and a target operation identifier corresponding to the target fingerprint, discussed above with reference to FIGS. 1 and 2. As depicted, utilizing 115 a target application to automatically execute a target function may include determining whether the target application is a currently running application on the electronic device. For example, the target application may be an application which has been in a running state before the user performs fingerprint input. Alternatively, the target application may not be currently running when user performs fingerprint input, thus utilizing 115 a target application to automatically execute a target function may include launching the target application after the fingerprint acquisition device obtains the target fingerprint in response to the target application not being a currently running application.

Figure 5:
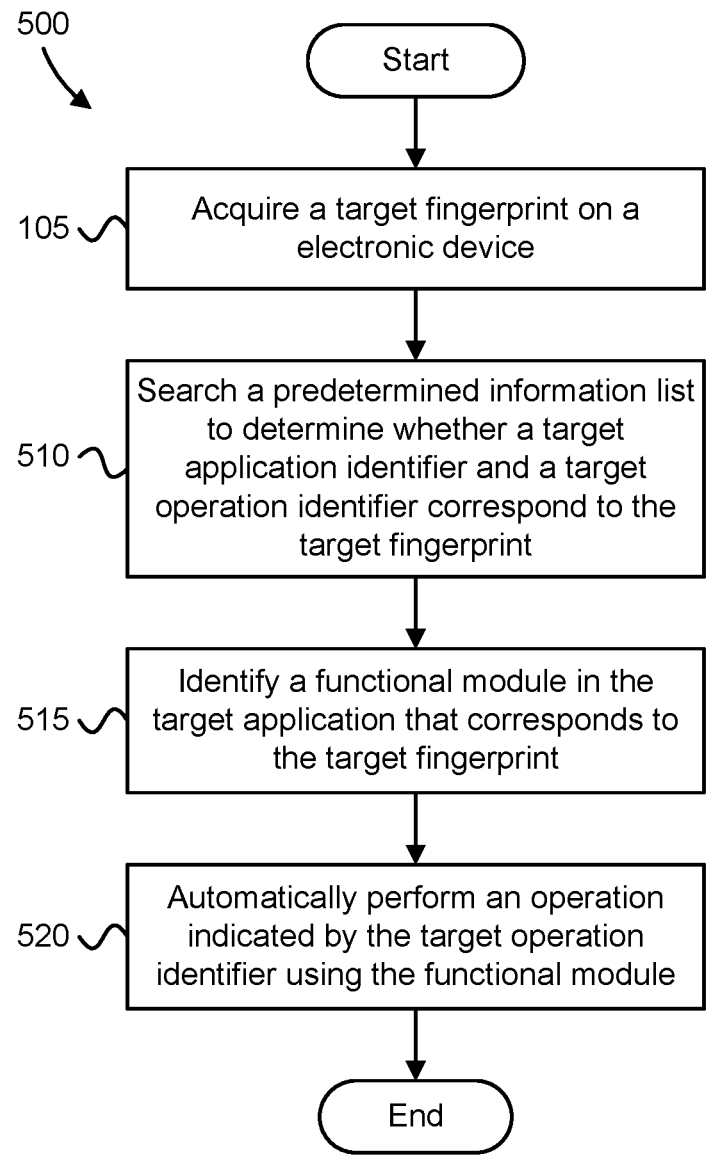
FIG. 5 is a flow diagram of a method for performing a function of an electronic device in response to a target fingerprint.

FIG. 5 is a flow diagram illustrating a method 500 for performing a function of an electronic device in response to a target fingerprint, according to embodiments of the disclosure. In one embodiment, the method 500 may be implemented by an electronic device having a fingerprint acquisition function, such as a cell phone, a pad, or other suitable electronic device. Examples of suitable electronic devices are discussed in further detail below with reference to FIGS. 6-8. Alternatively, the method 500 may be performed by a processor and a computer readable storage medium. The computer readable storage medium may store code that is executed on the processor to perform the functions of the method 500. The method 500 may be one embodiment of the method 100 discussed above with reference to FIG. 1.

The method 500 begins and acquires 105 a target fingerprint on the electronic device. Acquiring 105 the target fingerprint may be done via a fingerprint sensor or other fingerprint acquisition unit and is discussed in further detail above with reference to FIG. 1. The method 500 further searches 510 a predetermined information list to determine whether a target application identifier and a target operation identifier correspond to the target fingerprint. In one embodiment, searching 510 the predetermined information list may be one embodiment of determining 110 whether a target application identifier and a target operation identifier correspond to the target fingerprint. As discussed above, the electronic device may include an information list storing various target fingerprints and both a target application identifier and a target operation identifier that correspond to each target fingerprint in the list.

The method 500 includes identifying 515 a functional module that corresponds to the target fingerprint in the target application. In some embodiments, multiple functional modules may be included the target application, to implement multiple functions under the target application. Examples of multiple functional modules include, but are not limited to, an information sending module, a voice call module, and a video call module. Specifically, at least one functional module of the functional modules under the target application corresponds to one target fingerprint. The functional module corresponding to the target fingerprint may be identified from among the various functional modules of the target application after the target application identifier and target operation identifier are obtained. In one embodiment, the target application identifier indicates a particular function module. In another embodiment, the target operation identifier indicates the particular function module.

In certain embodiments, identifying 515 a functional module that corresponds to the target fingerprint in the target application may include determining whether the target application include the identified functional module. For example, the functional module may be a plug-in or add-on to the target application that requires downloading and/or installation before use. In such embodiments, the method 500 may abort if the target application does not include the identified functional module. Alternatively, the method 500 may wait until the functional module is installed before proceeding.

Thereafter, the method 500 includes automatically performing an operation indicated by the target operation identifier using the identified functional module of the target application.

That is, the functional module that corresponds to the target fingerprint is executed within the target application to implement the target function corresponding to the target fingerprint. For example, a fingerprint of the thumb on the right hand may correspond to initiating a voice communication function with the user's contact "Zhangsan," a fingerprint of the index finger on the right hand corresponds to initiating a voice communication function with the user's contact "Lisa," a fingerprint of the index finger on the left hand may correspond to initiating a video communication function with the user's contact "Lisa," and so forth.

It is to be noted that different target fingerprint may correspond to different functional modules in the target application. For example, fingerprint A may correspond to automatically initiating a voice call to the user's contact "Zhangsan" using a telephone application directory/window, fingerprint B may correspond to automatically initiating a voice call of Lisa in a directory. In another example, fingerprint C may correspond to automatically initiating a video call to the user's contact "Zhangsan" in the application WeChat, and fingerprint D may correspond to automatically initiating a video call to the user's contact "Lisa in the application WeChat.

Figure 6:
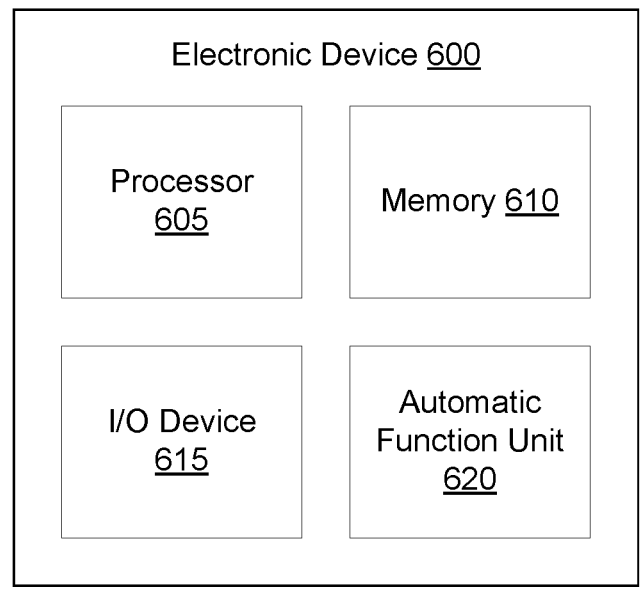
FIG. 6 is a schematic diagram of an electronic device for performing a function of an electronic device in response to a target fingerprint.

FIG. 6 illustrates an electronic device 600 for automatically performing a function in response to a target fingerprint, according to embodiments of the disclosure. In the depicted embodiment, the electronic device 600 includes a processor 605, a memory 610, an input/output device 615, and an automatic function unit 620. In some embodiments, the electronic device 600 is a computing device, such as a smartphone, mobile phone, personal digital assistant ("PDA"), tablet computer, laptop computer, desktop computer, personal computer, mainframe, server, terminal station, and the like.

The processor 605, in one embodiment, may comprise any known controller capable of executing computer-readable instructions and/or capable of performing logical operations. For example, the processor 605 may be a microcontroller, a microprocessor, a central processing unit (CPU), a graphics processing unit (GPU), an auxiliary processing unit, a FPGA, an integrated circuit, or similar controller. In certain embodiments, the processor 605 may include multiple processing units, such as multiple processing cores, multiple CPUs, multiple microcontrollers, or the like.

In some embodiments, the processor 605 executes instructions stored in the memory 610 to perform the methods and routines described herein. The processor 605 is communicatively coupled to the memory 610, the input/output device 615, and the automatic function unit 620. In various embodiments, the processor 605 may be communicatively coupled to a network interface, transceiver, or similar means for communicating with another electronic device (not shown). For example, the processor 605 may communicate with a remote terminal to establish a voice communication, video communication, chat, etc.

The memory 610, in one embodiment, is a computer readable storage medium. In some embodiments, the memory 610 includes volatile computer storage media. For example, the memory 610 may include a random access memory (RAM), including dynamic RAM (DRAM), synchronous dynamic RAM (SDRAM), and/or static RAM (SRAM). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to automatically performing a function in response to a target fingerprint. For example, the memory 610 may store an information list, a user's contacts, and the like. In some embodiments, the memory 610 also stores executable code and related data, such as an operating system or other controller algorithms operating on the electronic device 600. Further, the memory 610 may store code for one or more target applications operating on the electronic device 600.

The input/output device 615, in one embodiment, includes a fingerprint sensor for acquiring a target fingerprint. Further, the input/output device 615 may include any known computer input device including a touch panel, a button, a keyboard, a stylus, a microphone, or the like. In some embodiments, one or more input portions of the input/output device 615 may be integrated with one or more output portions, for example, as a touchscreen or similar touch-sensitive display. In some embodiments, the input/output device 615 includes a touchscreen such that text may be input using a virtual keyboard displayed on the touchscreen and/or by handwriting on the touchscreen. In some embodiments, the input/output device 615 includes two or more different input devices, such as a keyboard and a touch panel.

The input/output device 615 may also be designed to output visual, audible, and/or haptic signals. In some embodiments, the input/output device 615 includes an electronic display capable of outputting visual data to a user. For example, the input/output device 615 may include, but is not limited to, an LCD display, an LED display, an OLED display, a projector, or similar display device capable of outputting images, text, or the like to a user. As another, non-limiting, example, the input/output device 615 may include a wearable display such as a smart watch, smart glasses, a heads-up display, or the like. Further, the input/output device 615 may be a component of a smart phone, a personal digital assistant, a television, a table computer, a notebook (laptop) computer, a personal computer, a vehicle dashboard, or the like.

In certain embodiments, the input/output device 615 includes one or more speakers for producing sound. For example, the input/output device 615 may produce an audible alert or notification (e.g., a beep or chime). In some embodiments, the input/output device 615 includes one or more haptic devices for producing vibrations, motion, or other haptic feedback. In some embodiments, at least a portion of the input/output device 615 may be a headphone, headset, handset, earphone, earpiece, eyepiece, or similar device located remotely and/or separable from the rest of electronic device 600.

The automatic function unit 620, in one embodiment, acquires a target fingerprint on the electronic device, determines whether a target application identifier and a target operation identifier correspond to the target fingerprint, and utilizes a target application indicated by the target application identifier to execute, automatically, a target function indicated by the target operation identifier in response to a target application identifier and a target operation identifier corresponding to the target fingerprint. The automatic function unit 620 may be embodied by computer hardware, computer software, or a combination of computer hardware and computer software. Embodiments of the automatic function unit 620 are discussed below with reference to FIGS. 7-8.

Figure 7:
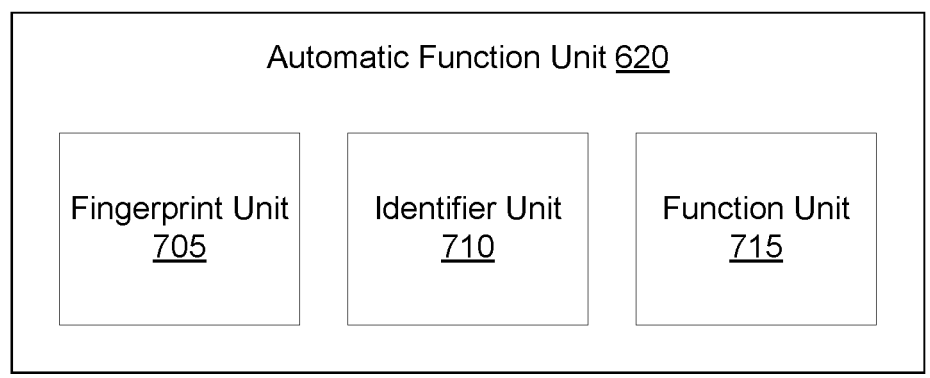
FIG. 7 is a schematic diagram of an automatic function unit of the electronic device of FIG. 6.

FIG. 7 is a schematic diagram of one embodiment of automatic function unit 620. As depicted, the automatic function unit 620 includes a fingerprint unit 705, an identifier unit 710, and a function unit 715.

The fingerprint unit 705, in one embodiment, communicated with a fingerprint sensor to acquire a target fingerprint on the electronic device. In one embodiment, the fingerprint sensor is collocated with a touchscreen display, such that the fingerprint unit 705 acquires the target fingerprint from an operation body of a user, such as a finger, interacting with (e.g., clicking) the touch display.

The identifier unit 710, in one embodiment, determines whether a target application identifier and a target operation identifier correspond to the target fingerprint. In some embodiments, the identifier unit 710 searches a predefined information list to discover whether the target fingerprint matches any a target application identifier and a target operation identifier. The information list may be preset on the electronic device, for example established when a user first uses the electronic device 600. The information list may also be modifiable by the user. In certain embodiments, the information list includes multiple application identities and operation identities, each of the application identities and the operation identities having a corresponding target fingerprint. In some embodiments, different fingerprints of a user may correspond to different target application identifiers and target operation identifiers. In certain embodiments, the information list may store fingerprints and corresponding target application/operation identifiers for different users of the electronic device. The identifier unit 710 may be communicatively coupled to the fingerprint unit 705 in order to receive a target fingerprint from the fingerprint unit 705.

The function unit 715, in one embodiment, utilizes a target application indicated by the target application identifier to execute, automatically, a target function indicated by the target operation identifier in response to a target application identifier and a target operation identifier corresponding to the target fingerprint. The function unit 715 may be communicatively coupled to the identifier unit 710 in order to receive the target application identifier and target operation identifier that correspond to the target fingerprint.

Figure 8:
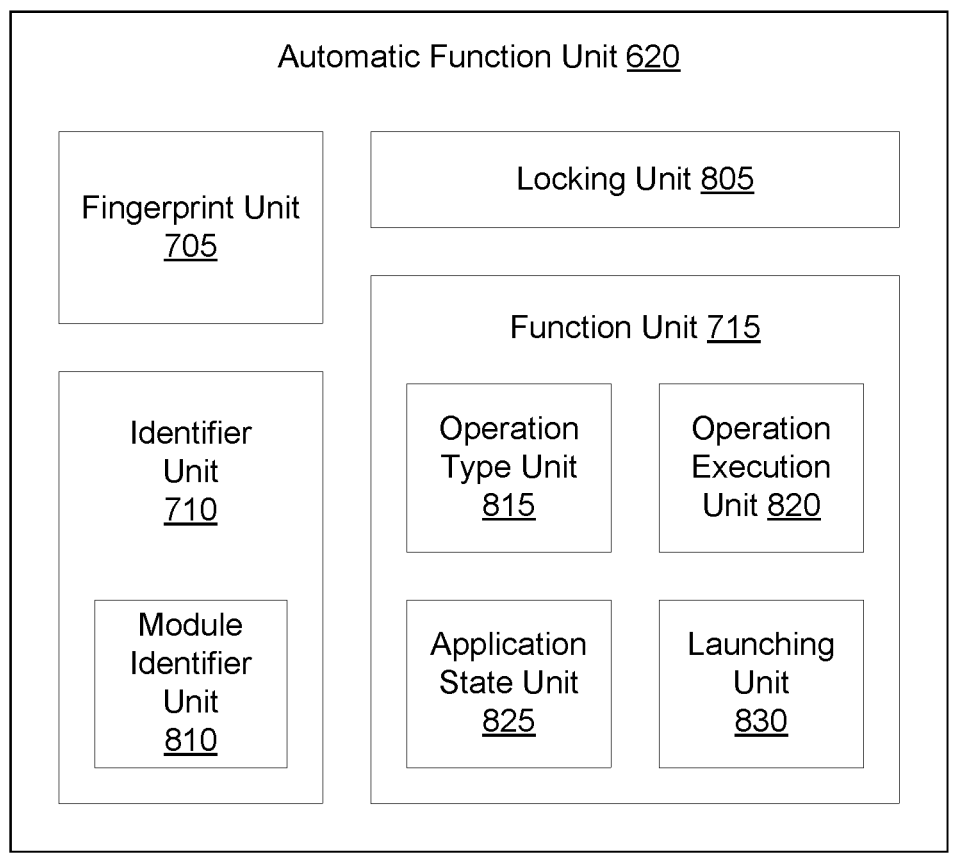
FIG. 8 is an expanded schematic diagram of an automatic function unit of the electronic device of FIG. 6.

FIG. 8 is a schematic diagram of another embodiment of an automatic function unit 620. As depicted, the automatic function unit 620 includes a fingerprint unit 705, an identifier unit 710, and a function unit 715. The fingerprint unit 705, identifier unit 710, and function unit 715 may be substantially as described above with reference to FIG. 7. The automatic function unit 620 further includes a locking unit 805, a module identifier unit 810, an operation type unit 815, an operation execution unit 820, an application state unit 825, and a launching unit 830.

The locking unit 805, in one embodiment, places the electronic device 600 in a screen unlocked state in response to the target fingerprint matching a screen unlocking fingerprint. In one embodiment, the locking unit 805 compares the target fingerprint to the screen unlocking fingerprint in response to the fingerprint unit 705 acquiring the target fingerprint. Further, the locking unit 805 may place the electronic device 600 in a screen unlocked state before or after the identifier unit 710 determines whether a target application identifier and a target operation identifier correspond to the target fingerprint and before or after the function unit 715 utilizes a target application indicated by the target application identifier to execute, automatically, a target function indicated by the target operation identifier in response to a target application identifier and a target operation identifier corresponding to the target fingerprint.

The module identifier unit 810, in one embodiment, identifies a functional module in the target application that corresponds to the target fingerprint. In some embodiments, multiple functional modules may be included the target application, to implement multiple functions under the target application, with at least one functional module of the functional modules under the target application corresponding to one target fingerprint. In one embodiment, the target application identifier indicates a particular function module. In another embodiment, the target operation identifier indicates the particular function module. Thus, the module identifier unit 810 may be communicatively coupled to the identifier unit 710 in order to receive the target application identifier and/or the target operation identifier.

In certain embodiments, the module identifier unit 810 may determine whether the target application includes the identified functional module. For example, the functional module may be a plug-in or add-on to the target application that requires downloading and/or installation before use. Further, the module identifier unit 810 may download/install the identified functional module, should it not be installed.

The operation type unit 815, in one embodiment, identifies a communication operation type in the target operation identifier. In certain embodiments, the communication operation type may be a type of voice communication, text communication, video communication, or the like. The operation execution unit 820, in one embodiment, executes a communication operation using the target application as indicated by the communication operation type on the electronic device.

The application state unit 825, in one embodiment, determine whether a target application is currently running on the electronic device 600. In some embodiments, the application state unit 825 accesses an application programming interface (API) provided by the operating system to determine whether the target application is currently running. In other embodiments, the application state unit 825 may determine whether a target application is currently running on the electronic device 600 by examining the processes running on the processor 605 and determining whether any running processes match the target application.

The launching unit 830, in one embodiment, launches the target application corresponding to the target application identifier when the target application identifier and the target operation identifier that correspond to the target fingerprint are found in the information list. In some embodiments, the application state unit 825 determines that the target application is not currently running on the electronic device 600 and the launching unit 830 launches the target application. While depicted as a component of the function unit 715, in other embodiments the launching unit 830 may be an independent component of the automatic function unit 620 communicatively coupled to the function unit 715 and/or the application state unit 825.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   storing a set of fingerprints and a set of applications, wherein the set of fingerprints corresponds to a single user;
   acquiring a target fingerprint on an electronic device;
   identifying a target application identifier and a target operation identifier that correspond to the target fingerprint, wherein each fingerprint in the set of fingerprints corresponds to one target application identifier and one target operation identifier, wherein different fingerprints in the set of fingerprints correspond to different combinations of applications and functions as predetermined by the single user;
   determining a target application indicated by the target application identifier and a target function indicated by the target operation identifier, wherein the target application is a communication application, wherein the target operation identifier identifies one of: a communication type and a communication counterpart; and
   utilizing the target application to execute, automatically, the target function in response to acquiring the target fingerprint, wherein executing the target function comprises one of: initiating communication according to the communication type indicated by the target operation identifier and initiating communication with the communication counterpart indicated by the target operation identifier.

2. The method of claim 1, wherein the electronic device is in a screen locked state before acquiring the target fingerprint on the electronic device, the method further comprising:
   placing the electronic device in a screen unlocked state in response to the target fingerprint matching a screen unlocking fingerprint for the electronic device.

3. The method of claim 1, wherein the electronic device is in a screen locked state before acquiring the target fingerprint on the electronic device, the method further comprising:
   determining whether the target fingerprint matches a screen unlocking fingerprint of the electronic device in response to determining that the target application identifier and the target operation identifier do not correspond to the target fingerprint; and
   placing the electronic device in a screen unlocked state in response to the target fingerprint matching a screen unlocking fingerprint for the electronic device.

4. The method of claim 1, wherein utilizing the target application indicated by the target application identifier to execute a target function indicated by the target operation identifier comprises:
   identifying a functional module in the target application that corresponds to the target fingerprint; and
   utilizing the target application to execute the functional module.

5. The method of claim 1, wherein utilizing the target application indicated by the target application identifier to execute a target function indicated by the target operation identifier comprises:
   determining whether the target application is currently running on the electronic device; and
   launching the target application indicated by the target application identifier in response to the target application not currently running on the electronic device.

6. The method of claim 5, wherein the electronic device is in a screen locked state before acquiring the target fingerprint, wherein launching a target application indicated by the target application identifier comprises:
   controlling the electronic device to enter an unlocked state from a screen locked state prior to launching the target application.

7. The method according to claim 1, wherein identifying a target application identifier and a target operation identifier that correspond to the target fingerprint comprises searching a predetermined information list, wherein the predetermined information list stores a plurality of target fingerprints, each target fingerprint corresponding to a different target function.

8. An electronic device, comprising:
   a fingerprint acquisition unit;
   a processor;
   a memory that stores code executable by the processor to:

store a set of fingerprints and a set of applications, wherein the set of fingerprints corresponds to a single user;

acquire a target fingerprint on the electronic device;

identify a target application identifier and a target operation identifier that correspond to the target fingerprint, wherein each fingerprint in the set of fingerprints corresponds to one target application identifier and one target operation identifier, wherein different fingerprints in the set of fingerprints correspond to different combinations of applications and functions as predetermined by the single user;

determine a target application indicated by the target application identifier and a target function indicated by the target operation identifier, wherein the target application is a communication application, wherein the target operation identifier identifies one of: a communication type and a communication counterpart; and utilize the target application to execute, automatically, the target function in response to acquiring the target fingerprint, wherein executing the target function comprises one of: initiating communication according to the communication type indicated by the target operation identifier and initiating communication with the communication counterpart indicated by the target operation identifier.

9. The electronic device of claim 8, wherein the electronic device is in a screen locked state before the processor acquires the target fingerprint on the electronic device, wherein the processor further:

places the electronic device in a screen unlocked state in response to the target fingerprint matching a screen unlocking fingerprint of the electronic device.

10. The electronic device of claim 8, wherein the electronic device is in a screen locked state before the processor acquires the target fingerprint on the electronic device, wherein the processor further;

determines whether the target fingerprint matches a screen unlocking fingerprint of the electronic device in response to determining that the target application identifier and the target operation identifier do not correspond to the target fingerprint; and places the electronic device in a screen unlocked state in response to the target fingerprint matching a screen unlocking fingerprint of the electronic device.

11. The electronic device of claim 8, wherein utilizing the target application indicated by the target application identifier to execute a target function indicated by the target operation identifier comprises the processor:

identifying a functional module in the target application that corresponds to the target fingerprint; and utilizing the target application to execute the functional module without user input.

12. The electronic device of claim 8, wherein utilizing the target application indicated by the target application identifier to execute a target function indicated by the target operation identifier comprises the processor:

determining whether the target application is currently running on the electronic device; and launching the target application indicated by the target application identifier in response to the target application not currently running on the electronic device.

13. The electronic device of claim 12, wherein the electronic device is in a screen locked state before acquiring the target fingerprint, wherein launching a target application indicated by the target application identifier comprises the processor:

controlling the electronic device to enter an unlocked state from a screen locked state prior to launching the target application.

14. The electronic device of claim 8, wherein identifying a target application identifier and a target operation identifier that correspond to the target fingerprint comprises searching a predetermined information list, wherein the predetermined information list stores a plurality of target fingerprints each target fingerprint corresponding to a different target function.

15. A program product comprising a computer readable storage medium that is not a transitory signal and that stores code executable by a processor, the executable code comprising code to perform:

storing a set of fingerprints and a set of applications, wherein the set of fingerprints corresponds to a single user;

acquiring a target fingerprint on an electronic device;

identifying a target application identifier and a target operation identifier that correspond to the target fingerprint, wherein each fingerprint in the set of fingerprints corresponds to one target application identifier and one target operation identifier, wherein different fingerprints in the set of fingerprints correspond to different combinations of applications and functions as predetermined by the single user;

determining a target application indicated by the target application identifier and a target function indicated by the target operation identifier, wherein the target application is a communication application, wherein the target operation identifier identifies one of a communication type and a communication counterpart; and utilizing the target application to execute, automatically, the target function in response to acquiring the target fingerprint, wherein executing the target function comprises one of initiating communication according to the communication type indicated by the target operation identifier and initiating communication with the communication counterpart indicated by the target operation identifier.

16. The program product of claim 15, wherein utilizing the target application indicated by the target application identifier to execute a target function indicated by the target operation identifier comprises:

identifying a functional module in the target application that corresponds to the target fingerprint; and utilizing the target application to automatically execute the functional module.

17. The program product of claim 15, wherein utilizing the target application indicated by the target application identifier to execute a target function indicated by the target operation identifier comprises:

determining whether the target application is currently running on the electronic device; and launching the target application indicated by the target application identifier in response to the target application not currently running on the electronic device.

18. The program product of claim 15, wherein identifying a target application identifier and a target operation identifier that correspond to the target fingerprint comprises searching a predetermined information list, wherein the predetermined information list stores a plurality of target fingerprints each target fingerprint corresponding to a different target function.

* * * * *